United States Patent [19]

Kassner

[11] 4,080,401

[45] Mar. 21, 1978

[54] HEAT-RESISTANT ADHESIVES AND PROCESS FOR IMPROVING THE THERMAL STABILITY OF ADHESIVE BONDS

[75] Inventor: Karl-Heinz Kassner, Dusseldorf, Germany

[73] Assignee: Henkel KGaA, Dusseldorf, Germany

[21] Appl. No.: 711,587

[22] Filed: Aug. 4, 1976

[51] Int. Cl.$^2$ ............................................. C08L 63/00
[52] U.S. Cl. .............................. 260/831; 260/830 P; 428/413; 428/414; 428/416
[58] Field of Search .............................. 260/831, 830 P

[56] References Cited

U.S. PATENT DOCUMENTS

| | | | |
|---|---|---|---|
| 3,177,090 | 4/1965 | Bayes | 260/831 |
| 3,282,896 | 11/1966 | Einberg | 260/831 |
| 3,321,549 | 5/1967 | Barth | 260/831 |
| 3,504,627 | 4/1970 | Elder | 260/831 |
| 3,862,260 | 1/1975 | Sellers | 260/831 |
| 3,931,109 | 1/1976 | Martin | 260/831 |
| 3,931,116 | 1/1976 | Bernstein | 260/830 P |
| 3,960,799 | 6/1976 | Mosimann | 260/830 P |

FOREIGN PATENT DOCUMENTS

| | | | |
|---|---|---|---|
| 6,606,990 | 11/1966 | Netherlands | 260/831 |

*Primary Examiner*—Paul Lieberman
*Attorney, Agent, or Firm*—Hammond & Littell

[57] ABSTRACT

Heat-resistant adhesives comprising 100 parts by weight of polyurethane components and 5 to 30 parts by weight of an adduct of an epoxy compound having more than one epoxide group in the molecule with a Novolak resin, as well as the method of improving the thermal stability of adhesives based on polyurethanes or polyisocyanates which comprises adding 5 to 30 parts by weight of an adduct of an epoxy compound having more than one epoxide group in the molecule with a Novolak resin, based on 100 parts by weight of solvent-free polyurethane or polyisocyanate, respectively.

11 Claims, No Drawings

HEAT-RESISTANT ADHESIVES AND PROCESS FOR IMPROVING THE THERMAL STABILITY OF ADHESIVE BONDS

RELATED ART

The so-called two-component adhesives based, for example, on compounds such as polyesters or polyethers, containing more than one hydroxyl group per molecule and on compounds containing more than one isocyanate group per molecule, are frequently used in the production of heat-resistant adhesive bonds. These adhesives are referred to as polyurethane adhesives or polyisocyanate adhesives since an excess of isocyanate groups are present after the two-components are reacted. The polyurethane adhesives hitherto used for such adhesive bondings, for example, of electrically insulated materials, will withstand a long-term thermal load of only 100° C to 130° C. This corresponds to what is called heat class "E".

OBJECTS OF THE INVENTION

An object of the present invention is to improve the known adhesives based on polyurethanes or multifunctional isocyanates with regard to their thermo-stability.

Another object of the present invention is the development of a heat-resistant adhesive composition comprising 100 parts by weight of a polyurethane component selected from the group consisting of organic solvent-soluble polyurethanes containing unreacted hydroxyl and isocyanate groups in the molecule and organic solvent-soluble two-component mixtures of (a) compounds having more than one hydroxyl group in the molecule and (b) compounds having more than one isocyanate group in the molecule where the amount of isocyanate groups is greater than the amount of hydroxyl groups, and from 5 to 30 parts by weight of an adduct of an epoxy compound having more than one epoxide group in the molecule with a Novolak resin.

A further object of the present invention is the development of a process for the improvement of the thermal stability of adhesives based on polyurethanes or polyisocyanates comprising adding from 5 to 30 parts by weight of an adduct of an epoxy compound having more than one epoxide group in the molecule with a Novolak resin, to 100 parts by weight of a solvent-free polyurethane or polyisocyanate adhesive, and thermally hardening said adhesives.

These and other objects of the invention will become more apparent as the description thereof proceeds.

DESCRIPTION OF THE INVENTION

In order to obtain the above objects and to overcome the drawbacks of the related art, it was found that the addition of 5 to 30 parts by weight of an adduct of a multifunctional epoxy compound with a Novolak resin, based on 100 parts by weight of solvent-free polyurethane or polyisocyanate, to a polyurethane or polyisocyanate adhesive improved its thermal stability.

More particularly, therefore, the present invention involves a heat-resistant adhesive composition comprising 100 parts by weight of a polyurethane component selected from the group consisting of organic solvent-soluble polyurethanes containing unreacted hydroxyl and isocyanate groups in the molecule and organic solvent-soluble two-component mixtures of (a) compounds having more than one hydroxyl group in the molecule and (b) compounds having more than one isocyanate group in the molecule, where the amount of isocyanate groups is greater than the amount of hydroxyl groups, and from 5 to 30 parts by weight of an adduct of an epoxy compound having more than one epoxide in the molecule with a Novolak resin; as well as a process for the improvement of the thermal stability of adhesives based on polyurethanes or polyisocyanates comprising adding from 5 to 30 parts by weight of an adduct of an epoxy compound having more than one epoxide group in the molecule with a Novolak resin, to 100 parts by weight of a solvent-free polyurethane or polyisocyanate adhesive, and thermally hardening said adhesives.

The adducts of multifunctional epoxy compounds to a Novolak resin are substances known in themselves, which can be obtained by reaction of a Novolak resin with the so-called epoxy resins, for example, the diglycidol ether of diphenylolpropane or the epoxidized cycloaliphatic dienes or also triazine epoxy resins.

The multifunctional epoxy compounds are those epoxy compounds with more than one epoxide group in the molecule, which are free of other reactive groups. Such compounds are the polyglycidol ethers of polyols such as the diglycidol ethers of diphenylolmethane and diphenylolpropane, the polyepoxidized aliphatic or cycloaliphatic polydienes, such as epoxidized cyclohexadiene, or also glycidyl esters of isocyanuric acid. A Novolak resin is the reaction product of a slight excess of a phenol and formaldehyde in the presence of an acidic catalyst. The resulting product has essentially no methylol groups and a diphenylmethane type of structure. The adduct of the multifunctional epoxy compounds with a Novolak resin are ordinarily prepared by heating the two components to temperatures above 100° C. The components of the adducts are preferably chosen so that the adduct has an epoxide oxygen content of from 3% to 6%.

The polyurethane adhesives employed are, in particular, those which have been produced from commercial polyesters still containing free OH groups, and which are crosslinked with multifunctional isocyanates. The polyesters still containing free OH groups often contain as the polycarboxylic acid component, alkanedioic acids having from 4 to 40 carbon atoms, such as adipic acid, sebacic acid, dimerized fatty acid; or benzenepolycarboxylic acids, such as phthalic acid, isophthalic acid; and as the polyol component, ethylene glycol, diethylene glycol, triethylene glycol, and in minor quantities frequently glycerin or trimethylol propane. Also it is possible to use polyethers of higher molecular weight containing OH groups, as for example, polyethylene glycol or polypropylene glycol, as OH group-containing component together with the isocyanates. The named hydroxyl compounds should have a hydroxyl number of between about 40 and 120. The multifunctional isocyanates employed are the benzene polyisocyanates and alkylbenzene-polyisocyanates, such as toluylene diisocyanate; naphthylene diisocyanate; diphenylmethane diisocyanate; diphenylmethane dimethoxy-diisocyanate; isophorone diisocyanate; alkane-polyisocyanates such as hexamethylene diisocyanate; as well as the trimerization products thereof and the adduct of toluylene diisocyanate to trimethylol propane in the molar ratio of 3 to 1.

As stated, the adducts of the multifunctional epoxy compounds to a Novolak resin are products known in themselves. Preferred are the adducts of crystalline triglycidyl isocyanurate to Novolak in the weight ratio of 30:70 to 60:40. It has proved particularly advantageous to use adducts which have an epoxide content of 3% to 6%.

The adhesives according to the invention are produced by mixing the named components advantageously with the use of organic solvents. As solvents there enter into consideration ketones, for example, lower alkanones, such as acetone, methylethyl ketone, isobutylmethyl ketone, or esters, for example, lower alkyl lower alkanoates, such as ethyl acetate or propyl acetate, as well as chlorinated hydrocarbons, such as methylene chloride, 1,2-dichloroethane and trichloroethane. Naturally also inert solvents can be used additionally, such as hydrocarbons, e.g., toluene or cyclohexane. The solvents employed should evaporate at temperatures below 110° C.

The adhesives according to the invention can be applied from their solutions on the materials to be bonded, or films can be produced from the solutions by applying solutions of the adhesive to silicone paper or materials otherwise finished anti-adhesively and detaching the film after evaporation of the solvent. In this way, on the one hand, coatings can be produced on materials to be bonded, as well as adhesive films which are detached from the support advantageously only just before their use. During the evaporation of the solvent, which advantageously occurs under the action of heat at temperatures of from 40° C to 110° C, a pre-reaction takes place, while the actual hardening occurs only in the course of the adhesive bonding.

The bonding itself requires only low pressures of from 1 to 10, more particularly 2 to 5, kp/cm² at temperatures of between about 120° C and 180° C for about 2 to 30 minutes.

Good bonds can be produced between a variety of materials such as copper, aluminum, bronze, stainless steel (V2A or 18/8). Also thermostable plastics can be bonded, such as polyimides, linear polyesters, polyhydantoins, polyamides, glass fibers, and veneers impregnated with phenol/formaldehyde resin or melamine/-formaldehyde resin.

The following examples are illustrative of the practice of the invention but are not to be considered limitative thereto.

EXAMPLE 1

45 gm of a liquid commercial polyester having a hydroxyl number of 58, and a molecular weight of 2000, which had been prepared from adipic acid and isophthalic acid (molar ratio 1:1) and diethylene glycol, were reacted with 10 gm of an adduct in equal parts by weight of crystalline triglycidyl isocyanurate to Novolak (epoxide oxygen content 4.8%) dissolved in 45 gm of methylethyl ketone. The mixture was warmed to about 40° C. To this reaction mixture, 20 gm of the addition product of toluylene diisocyanate to trimethylol propane, in a molar ratio of 3 to 1, were added. From this mixture films of about 10 gm/m² were produced on silicone paper by evaporation of the solvent at a temperature of about 70° C. At room temperatures the films produced had a storage stability of about 6 months.

With the films, steel sheets of a width of 2.5 cm were bonded with an overlap of 1 cm at a pressure of 3 kp/m² in 5 minutes at 160° C. The average tensile strength of the bond was 80 kg/cm² and the peeling strength was 11 kg/cm².

EXAMPLE 2

A liquid commercial polyester having a hydroxyl number of 58 and a molecular weight of 2000, which had been prepared from adipic acid and isophthalic acid (molar ratio 1:1) and diethylene glycol, was placed in a flask. Isophorone diioscyanate was added thereto in an amount sufficient to react with the hydroxyl groups plus a 5% excess. The reaction mixture was heated to about 70° C for about 1 hour with the exclusion of moisture. 60 gm of this adduct were mixed with 40 gm of anhydrous ethyl acetate and then 5 gm of the epoxide/Novolak adduct described in Example 1, having an epoxide oxygen content of 4.8%, dissolved in 5 gm of acetone, was added thereto. From this mixture films were poured on silicone paper, which after evaporation of the solvents at a temperature of about 70° C had a weight of 8 gm/m². Steel sheets were bonded as described in Example 1. There resulted an average tensile strength of the bond of 120 kg/cm² and a peeling strength of 20 kg/cm².

EXAMPLE 3

With the adhesive solutions according to Examples 1 and 2, copper foils on a drum were coated by means of coating rolls (dry application about 12 gm/cm²). After evaporation of the solvent at about 70° C, the coated foils were covered with unpretreated polyethylene foil and stored. The foils were bonded at a pressure of 3 kp/cm² at 145° C for 3 minutes with foils of linear polyester, polyimide and polyamide as well as aluminum and stainless steel (18/8).

In all cases the bond had a solder bath stability of at least 260° C/10 sec.

EXAMPLE 4

870 gm of a liquid co-ester of adipic acid, isophthalic acid and diethylene glycol as described in Example 1 (molecular weight 2000, OH number = 58) and 130 gm of diphenylmethane diisocyanate were dissolved in 1000 gm of anhydrous ethyl acetate and reacted for 2 hours at 70° C. This adduct was then reacted with 100 gm of the adduct of toluylene diisocyanate to trimethylol propane (3:1 molar ratio). To this were then added 225 gm of the adduct ot crystalline triglycidyl isocyanurate (epoxide oxygen content 15.1%) to a Novolak resin, with a residual epoxide oxygen content of 4.6%.

With this, as described in Example 3, Cu foils were coated, and after evaporation of the solvent were bonded with polyimide foils.

The average solder bath stability was 260° C/15 sec.

COMPARISON EXAMPLE

Example 4 was repeated, but with the difference that the addition of adduct of triglycidyl isocyanurate to Novolak resin was omitted. Bubble formation then appeared already at 200° C/10 sec.

The preceding specific embodiments are illustrative of the practice of the invention. It is to be understood, however, that other expedients known to those skilled in the art or discussed herein may be employed without departing from the spirit of invention or the scope of the appended claims.

I claim:

1. A heat-resistant adhesive composition comprising 100 parts by weight of a polyurethane component selected from the group consisting of (1) organic solvent-soluble polyurethanes containing unreacted groups in the molecule, said unreacted groups being hydroxyl groups or isocyanate groups, and (2) organic solvent-soluble two-component mixtures of (a) compounds having more than one hydroxyl group in the molecule and (b) compounds having more than one isocyanate group in the molecule, where the amount of isocyanate groups is greater than the amount of hydroxyl groups, and from 5 to 30 parts by weight of an adduct of crystalline triglycidyl isocyanurate with a Novolak resin in a weight ratio of 30:70 to 60:40; having an epoxide oxygen content of from 3% to 6% by weight.

2. The adhesive composition of claim 1 dissolved in an organic solvent.

3. The adhesive composition of claim 1 wherein the polyurethane component is the component of clause (1) which is produced by crosslinking a polyester containing free OH groups with a multifunctional isocyanate.

4. The adhesive composition of claim 1 wherein the polyurethane component is the component of clause (1) which is produced by crosslinking a polyether containing free OH groups with a multifunctional isocyanate.

5. The adhesive composition of claim 1 wherein the polyurethane component is the component of clause (2) wherein the (a) compounds are polyesters containing free OH groups and the (b) compounds are multifunctional isocyanates.

6. The adhesive composition of claim 1 wherein the polyurethane component is the component of clause (2) wherein the (a) compounds are polyethers containing free OH groups and the (b) compounds are multifunctional isocyanates.

7. A process for the improvement of the thermal stability of adhesives based on polyurethanes or polyisocyanates consisting essentially of adding from 5 to 30 parts by weight of an adduct of crystalline triglycidyl isocyanurate with a Novolak resin in a weight ratio of 30:70 to 60:40, having an epoxide oxygen content of from 3% to 6%, to 100 parts by weight of a solvent-free polyurethane or polyisocyanate adhesive component selected from the group consisting of (1) organic solvent-soluble polyurethanes containing unreacted groups in the molecule, said unreacted groups being hydroxyl groups or isocyanate groups, and (2) organic solvent-soluble two-component mixtures of (a) compounds having more than one hydroxyl group in the molecule and (b) compounds having more than one isocyanate group in the molecule, where the amount of isocyanate groups is greater than the amount of hydroxyl groups, in an organic solvent solution, evaporating said solvent, and thermally hardening said adhesives.

8. The process of claim 7 wherein the polyurethane or polyisocyanate adhesive component is the component of clause (1) which is produced by crosslinking a polyester containing free OH groups with a multifunctional isocyanate.

9. The process of claim 7 wherein the polyurethane or polyisocyanate adhesive component is the component of clause (1) which is produced by crosslinking a polyether containing free OH groups with a multifunctional isocyanate.

10. The process of claim 7 wherein the polyurethane or polyisocyanate adhesive component is the component of clause (2) wherein the (a) compounds are polyesters containing free OH groups and the (b) compounds are multifunctional isocyanates.

11. The process of claim 7 wherein the polyurethane or polyisocyanate adhesive component is the component of clause (2) wherein the (a) compounds are polyethers containing free OH groups and the (b) compounds are multifunctional isocyanates.

* * * * *